INVENTOR.
VINCENT FERRARA,
BY

ATTORNEYS.

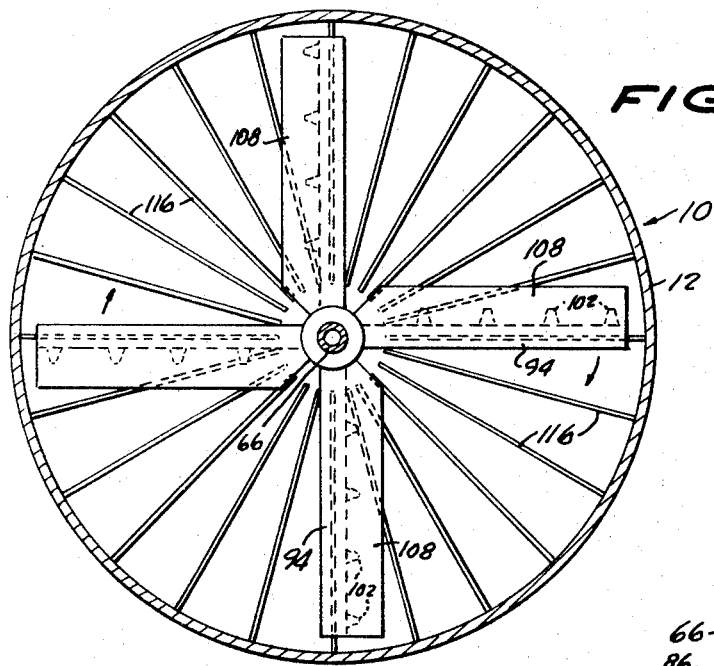
FIG. 2.
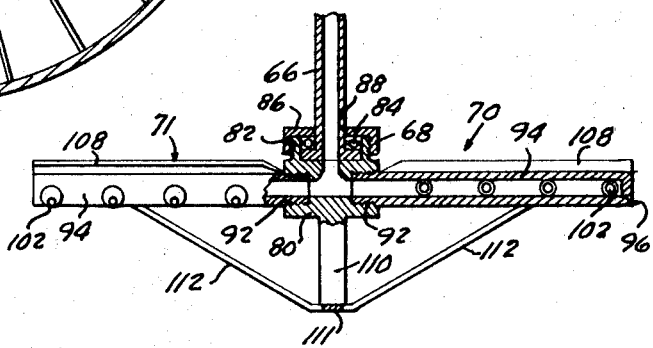
FIG. 3.
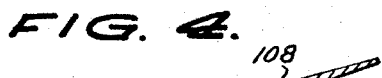
FIG. 4.
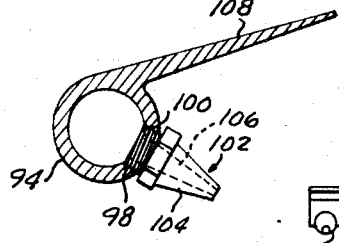
FIG. 5.
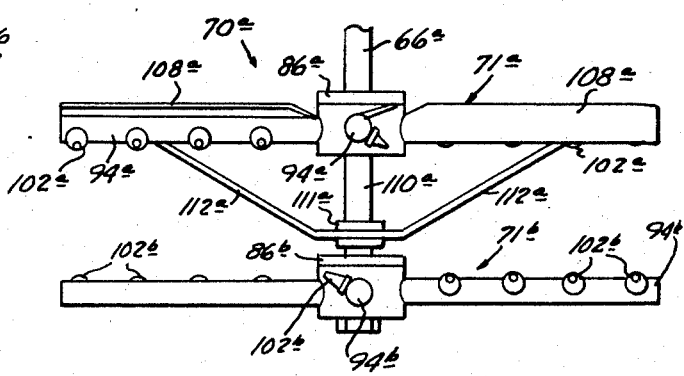
INVENTOR.
VINCENT FERRARA,
BY
Berman, Davidson & Berman
ATTORNEYS.

United States Patent Office 3,387,432
Patented June 11, 1968

3,387,432
SCRUBBERS
Vincent Ferrara, 936 N. 8th St.,
Reading, Pa. 18503
Filed Apr. 22, 1966, Ser. No. 551,823
8 Claims. (Cl. 55—228)

ABSTRACT OF THE DISCLOSURE

A gas scrubber and reactor comprising: a vertical casing having a gas outlet at its upper end; a gas inlet adjacent its lower end; a vat of scrubbing fluid below said inlet; baffles below said outlet; rotary spray means intermediate said baffles and said inlet and means for delivering power and scrubbing fluid to said rotary spray means.

---

This invention relates to gas-liquid contact apparatus, and more particularly to apparatus for exposing gaseous materials to agitated scrubbing and/or reacting fluids in spray form, for the purpose of removing contaminants from such materials and/or for rendering such materials unobjectionable when discharged to the atmosphere, as in air pollution abatement.

The primary object of the invention is the provision of efficient, simple, and economical method and apparatus for continuously accomplishing the above-indicated and other allied results, in a continuous recirculation system, wherein the scrubbing or reacting medium is sprayed in a fine fog or mist, into a vertical casing which is open to the atmosphere, only at its upper end, at a level below droplet baffle means intervening between the spray nozzle means and the atmospheric outlet, the sprayed medium being under pressure which serves also to draw scrubbing medium from the lower part of the casing to the spray nozzle means, the spray nozzle means being in the form of a rotary member having multiple nozzles arranged so that the rotary member is jet-propelled, the rotary member being operated relative to stationary fin means of hydrophobic material, and stationary rod means, for the breaking up and removal of droplets, the gaseous material being introduced into the casing at a point intermediate the rotary member and scrubbing or reacting liquid present in the lower part of the casing.

Another object of the invention is the provision of method and apparatus of the character indicated above, wherein the continuous recirculation of the scrubbing or reacting medium can be produced by mechanical pump means, but is preferably and more economically produced by steam or air pressure eduction means, which serves to simultaneously draw liquid medium by means of a partial vacuum, from the lower part of the casing and commingle it with the steam under pressure going to the spray means.

A further object of the invention is the provision of method and apparatus of the character indicated above, wherein the jet-propelled rotor assembly can consist of a single rotor, or a pair of rotors turning in opposite directions.

A still further object of the invention is the provision of method and apparatus of the character indicated above, wherein the need for slow and circuitous travel of scrubbing or reacting medium and gaseous material to be scrubbed or reacted with, is eliminated.

In the drawings:

FIGURE 2 is an enlarged top plan view of a single jet-propelled rotor assembly, taken on the line 2—2 of FIGURE 1;

FIGURE 3 is a side elevation, partly broken away and in section, of the rotor;

FIGURE 4 is an enlarged vertical section, taken on the line 4—4 of FIGURE 1; and, FIGURE 5 is a side elevation of a dual form of rotor assembly.

Figure 1:
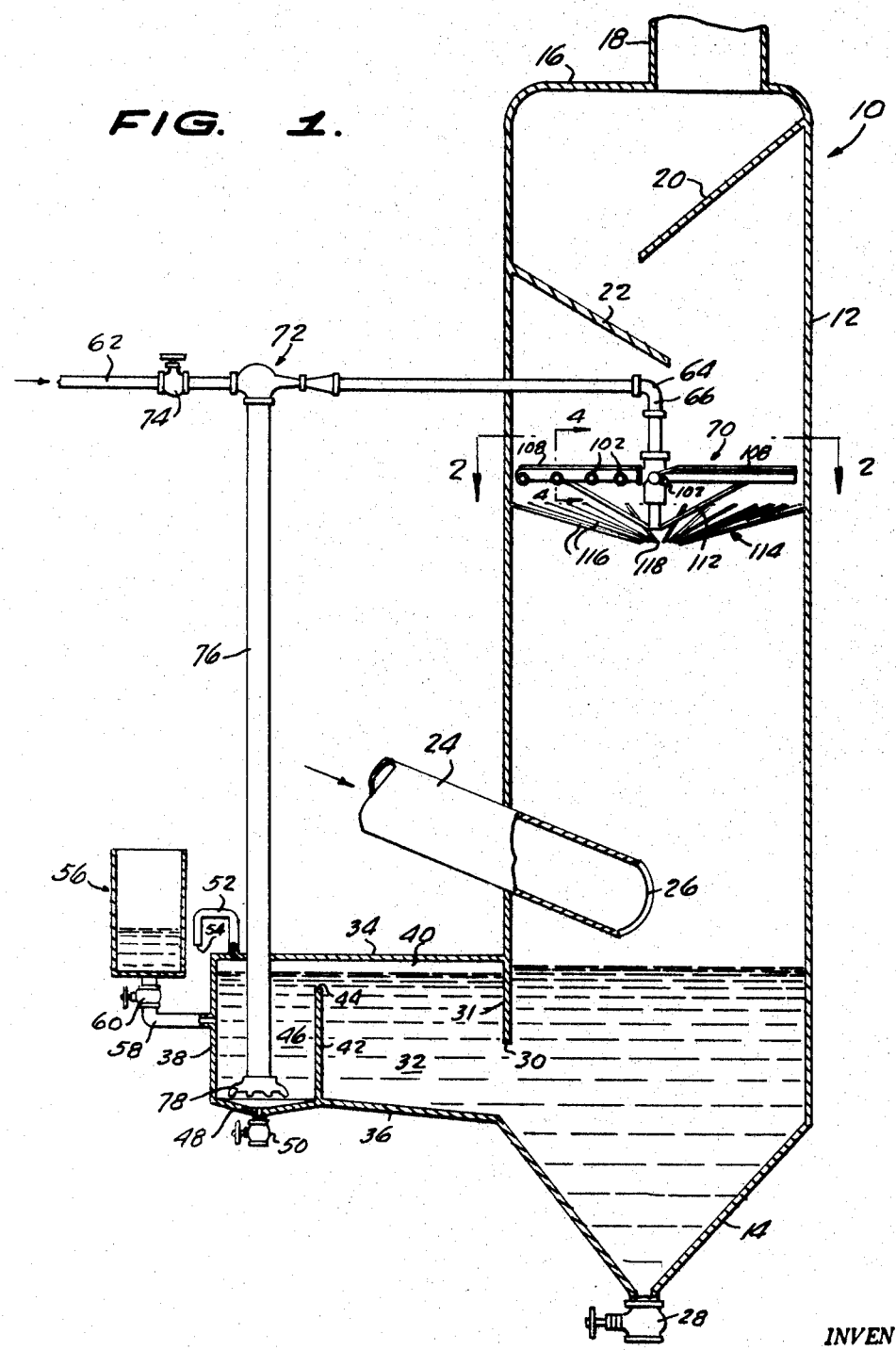
FIGURE 1 is a vertical section taken through the casing and gaseous fluid input thereto, of apparatus of the present invention.
Figure 1:

Referring in detail to the drawings, the illustrated apparatus comprises a vertically elongated cylindrical casing 10 having a side wall 12, a conical bottom wall 14, and a flat top wall 16, the top wall having therein a concentrically located upstanding atmospheric outlet pipe 18.

Immediately below the top wall 16, and extending across the open lower end of the outlet pipe 18, is an upper flat baffle 20, which extends at an inward and downward angle, relative to the part of the casing side wall 12, adjacent to the pipe. The baffle 20 extends about halfway across the casing 10. A similar lower baffle 22 extends inwardly and downwardly below the upper baffle 20, from the opposite side of the casing.

An inwardly and downwardly angled gaseous material input pipe 24 extends through the lower part of the casing side wall 12, at the same side thereof as the lower baffle 22, and has an open end 26 substantially at the vertical center of the casing, the gaseous material being forced into the casing only under sufficient pressure to assure an even and controlled introduction thereof.

A valve 28 is connected in communication with the lower end of the conical bottom wall 14, of the casing 10, for the purpose of drawing off settlings or residue.

The part of the casing side wall 12, adjacent to the input pipe 24, terminates, as indicated at 30, to form a vertical baffle 31, on a level above the conical bottom wall 14, so as to provide a circulation opening, between the interior of the casing 10 and an otherwise closed laterally outwardly projecting flow chamber 32, constituted by a flat horizontal top wall 34 affixed to the casing side wall, on a level above the lower side wall end 30, a bottom wall 36, the major part of which slants down to the upper end of the conical bottom wall 14, a vertical outer end wall 38, extending between the top and bottom walls, and side walls 40.

A vertical baffle wall 42 rises from the chamber bottom wall 36, and extends across the chamber 32, adjacent to and parallel to the outer end wall 38, and has an upper end 44 located adjacent to and spaced downwardly from the top wall 34, so as to define an entrance chamber 46. In the chamber 46 the bottom wall 36, of the chamber 32, is formed to provide a concave bottom wall 48, for the entrance chamber. A draw-off valve 50 is connected through the center of the bottom wall 48.

An upstanding inverted J-shaped overflow pipe 52 is connected through the chamber top wall 34 and has a downwardly facing outer lower end 54, and serves to prevent liquid in the casing 10 from rising as high as the inner end of the gaseous material input pipe 24.

For the purpose of introducing make-up scrubbing or reacting fluid, into the entrance chamber 46, a relatively small vertical open-top tank 56 is supported externally thereof, on an L-shaped pipe 58, having communication with the bottom of the tank 56 and with the chamber 46, through the outer end wall 38. A flow valve 60 is incorporated in the pipe 58.

A horizontal, relatively small diameter steam pipe 62, leading from a source of steam under pressure (not shown) extends through the side wall of the casing 10, at the same side as the chamber 32, on a level immediately below the lower baffle 22, and at the center of the casing, has on its inner end, an elbow 64, having a pendant perpendicular arm 66, which, as shown in FIGURE 3, has a lateral bearing flange 68, on its lower end, on which is rotatably supported a single rotor rotary spray assembly 70.

The steam pipe 62 is in vertical alignment with the vertical center of the entrance chamber 46, and has connected therein a steam pressure actuated educer 72, of the venturi type, which is preceded by a control valve 74. The entrance side of the educer 72 has connected thereto the upper end of a relatively large diameter suction pipe 76, which extends downwardly through the chamber top wall 34, into the entrance chamber 46. The lower end of the suction pipe 76 is located close to and is spaced above the bottom of the entrance chamber, and has a screen 78 thereon.

The rotary spray assembly 70 comprises a single rotor 71 having a hub 80 having thereon an upstanding socket 82, in which the lower end of the elbow arm 66, and its flange 68 are rotatably seated, with an anti-friction bearing 84 circumposed on the arm 66 and fitted in the socket 82, in contact with the top of the flange 68. A retaining cap nut 86 having a center hole 88, passing the arm 66, is threaded, as indicated at 90, on the socket 82. The hub 80 is formed with four equally circumferentially spaced, radial threaded sockets 92, in which are screwed the threaded inner ends of radial horizontal spray pipes 94, having closed outer ends 96.

As shown in FIGURE 4, the spray pipes 94 are formed, adjacent to their outer ends, and at equally spaced intervals inwardly therefrom, with threaded holes 98, which are angled downwardly, relative to the horizontal, at an angle of about 30 degrees. As shown in FIGURE 2, the rotor 71 is adapted to be rotated clockwise, so that the holes 98 are provided, in the spray pipes, at the trailing sides thereof. Screwed into the holes 98 are the studs 100 of jet nozzles 102, having outwardly tapered bodies 104, and outwardly tapered bores 106, opening to the outer ends of the bodies. The jets issuing from the nozzles 102 serve to rotate the rotor 71 clockwise.

Affixed on or formed on and extending along the tops of the spray pipes 94, to the outer ends thereof, which run close to the side wall 12 of the casing 10, are flat rectangular fins 108, narrower than their lengths, and substantially wider than the pipes 94, which extend beyond the trailing sides of the pipes 94. As shown in FIGURE 4, the fins 108 are outwardly tapered in cross section, and extend upwardly, relative to the horizontal, at an angle of about 15 degrees. The fins 108 are made of or are coated with hydrophobic material, such as "Teflon," which serves to resolve fog droplets into water droplets which are large enough to be readily separated. The upward pitch of the fins 108 serves to create an uplift of liquid, vapor, and gas, and provides a fanning action for sweeping the scrubbed gas up through the casing 10, so as to minimize any pressure losses, relative to the pressure at which the gaseous material is introduced into the casing 10.

The rotation of the spray pipes or rotor arms 94, of the rotor 71, together with their fins 108, produces, in the interior of the casing 10, between the rotor 71 and the lower baffle 22, a barrier of dancing droplets which prevents the discharge into the atmosphere, from the outlet pipe 18, of a fog or mist. The baffles 20, 22 serve to deflect downwardly any larger droplets rising thereto, to the sphere of action of the rotor 71.

As shown in FIGURES 1 and 3, the hub 80 of the rotor 71 has a pendant coaxial shaft 110, to whose lower end are fixed, as indicated at 111, the depressed inner ends of inwardly and downwardly angled brace bars 112, which underlie the spray pipes 94, and have their elevated outer ends affixed to the spray pipes adjacent to the outer ends thereof.

Spaced below the rotor 71 is a frusto-conical impact cage 114, composed of a large number of equally circumferentially spaced, inwardly and downwardly extending rods 116, disposed at an angle of about 30 degrees, to the horizontal. The rods 116 are suitably fixed, at their outer ends, to the casing side wall 12, and, at their inner ends, to a plate 118. As the rotor 71 rotates, the brace bars 112 sweep close to the impact rods 116, so that a chopping action is obtained, which is essential to obtaining effective contact between the gas and the liquid phases of the commingled materials, in the zone of the rotor 71, through atomizing the materials and the formation of a fine, high velocity rotating mist or fog.

As a substitute for obtaining the desired mist or fog, the places of the cooperating brace bars 112 and rods 116, may be taken by means of a dual rotor spray assembly 70a, shown in FIGURE 5.

The assembly 70a is composed of an upper rotor 71a and a lower rotor 71b, both rotors being of the same construction as the single rotor 71, of FIGURES 1 to 4, with the exectpion that the jet nozzles 102b, of the lower rotor 71b, are directed upwardly, at an angle of 30 degrees, relative to the horizontal, and are disposed at the opposite side of the spray pipe from the jet nozzles 102a, of the upper rotor 71a, so that the rotors rotate in opposite directions. The spray pipes 94b, of the lower rotor 71b, are devoid of fins.

For operatively supporting the lower rotor 71b, the hub shaft 110a of the upper rotor 71a is extended downwardly through a plate 111a joining the depressed ends of the brace rods 112a, of the upper rotor, and the lower rotor 71b is supportably journalled, on the lower end of the shaft 110a, like the upper rotor 71a, as shown in FIGURE 3. The rotors 71a and 71b are positioned close enough together, so that the spray streams issuing from their jet nozzles collide, while being rotated in opposite directions.

Where, as in scrubbing contaminated air and retaining it in clean condition to the atmosphere, in abatement of air pollution, a reacting medium is adapted to be used in the above-described apparatus. In such case, the scrubbing medium can be an oxidizer, such as a metal permanganate, a peroxide, a dichromate, or a hypochlorite. For example, using potassium permanganate, as the scrubbing medium, odors emitted by unclean air contaminated with effluent from the rendering of inedible grease, or gases such as hydrogen sulphide, nitrous oxide, asphalt, sewage, and others, can be oxidized and made harmless and odorless, and discharged into the atmosphere in clean condition.

Where potassium permanganate serves as the oxidizing agent, a residue of insoluble manganese dioxide is formed, which settles to the bottom of the casing 10, and may be drawn off through the valve 28. The supernatant liquid passes under the baffle 31, over the baffle wall 42, and into the extrance chamber 46.

In operation, the steam under pressure in the steam pipe 62, in passing through the educer 72, to the rotary spray assembly, creates a suction in the suction pipe 76, which serves to draw up liquid from the chamber 46, either supernatant or replenished, and this liquid joins the steam, in the educer 72, and passes to the spray assembly.

The gaseous material, such as unclean outside air, entering the casing 10, through the pipe 24, rises in the casing to the zone of action of the rotating spray assembly, where it is acted upon, as hereinabove described, and passes upwardly therefrom, around the baffles 20, 22, to the atmosphere, through the outlet pipe 18.

It will be seen from the foregoing that, as long as steam is supplied to the steam pipe 62, and air is supplied to the casing 10 through the pipe 24, and the level of the liquid in the casing and in the chambers 32 and 46 is maintained, the scrubbing action of the apparatus is continuous, with the fluid constantly and continuously being recirculated.

What is claimed is:

1. Apparatus of the character described, comprising a vertical casing having a top wall formed with opening means to the atmosphere, a side wall, and a conical bottom wall, a horizontal flow chamber consisting of a vertical end wall, side walls, and top and bottom walls, said chamber being connected to, communicating with and extending laterally from the side and the conical bottom walls of the casing to provide liquid passage between the interior of the casing and the interior of the flow chamber, said chamber being closed at its free end by said vertical end wall and open at the end connected to the side and bottom walls of the casing, a vertical baffle wall adjacent to and spaced from said end wall and extending across the flow chamber, said baffle wall having an upper edge spaced from the top of the flow chamber, said baffle wall and said end wall of the flow chamber defining an entrance chamber, a supported vertical pipe having an open lower end entering the entrance chamber and opening to said entrance chamber, the lower part of the casing and said chamber being adapted to receive and contain treating liquid, means for moving liquid upwardly in said vertical pipe from the entrance chamber, a horizontal steam pressure pipe spaced above said chambers to which the upper end of said vertical pipe is connected, said steam pipe traversing the side wall of the casing to the vertical center of the casing, a rotary spray assembly concentric with the casing side wall, said assembly being journalled on the steam pipe and in steam and treating liquid receiving relation to the steam pipe, and a gaseous material input pipe traversing the casing side wall at a location spaced between said spray assembly and said flow chamber.

2. Apparatus according to claim 1, wherein vertically spaced overlapped downwardly angled baffles are located between the spray assembly and the top wall of the casing and extend rearwardly from opposed portions of the casing side wall.

3. Apparatus according to claim 1, wherein vertically spaced overlapped downwardly angled baffles are located between the spray assembly and the top wall of the casing and extend rearwardly from opposed portions of the casing side wall, said spray assembly comprising rotor means having equally circumferentially spaced radial horizontal spray pipes having closed outer ends, the spray pipes being in communication at their inner ends with the steam pipe, downwardly angled longitudinally spaced jet nozzles on and communicating with the spray pipes, said nozzles being on the trailing sides of the spray pipes.

4. Apparatus according to claim 1, wherein vertically spaced overlapped downwardly angled baffles are located between the spray assembly and the top wall of the casing and extend rearwardly from opposed portions of the casing side wall, said spray assembly comprising rotor means having equally circumferentially spaced radial horizontal spray pipes having closed outer ends, the spray pipes being in communication at their inner ends with the steam pipe, downwardly angled longitudinally spaced jet nozzles on and communicating with the spray pipes, said nozzles being on the trailing sides of the spray pipes, said spray pipes having fins extending along their tops, said fins being disposed at an upward angle relative to the horizontal and reaching beyond the trailing sides of the spray pipes.

5. Apparatus according to claim 1, wherein vertically spaced overlapped downwardly angled baffles are located between the spray assembly and the top wall of the casing and extend rearwardly from opposed portions of the casing side wall, said spray assembly comprising rotor means having equally circumferentially spaced radial horizontal spray pipes having closed outer ends, the spray pipes being in communication at their inner ends with the stem pipe, downwardly angled longitudinally spaced jet nozzles on and communicating with the spray pipes, said nozzles being on the trailing sides of the spray pipes, said spray pipes having fins extending along their tops, said fins being disposed at an upward angle relative to the horizontal and reaching beyond the trailing sides of the spray pipes, said fins being of hydrophobic material.

6. Apparatus according to claim 1, wherein vertically spaced overlapped downwardly angled baffles are located between the spray assembly and the top wall of the casing and extend rearwardly from opposed portions of the casing side wall, said spray assembly comprising rotor means having equally circumferentially spaced radial horizontal spray pipes having closed outer ends, the spray pipes being in communication at their inner ends with the steam pipe, downwardly angled longitudinally spaced jet nozzles on and communicating with the spray pipes, said nozzles being on the trailing sides of the spray pipes, said rotor means consisting of a single rotor.

7. Apparatus according to claim 1, wherein vertically spaced overlapped downwardly angled baffles are located between the spray assembly and the top wall of the casing and extend rearwardly from opposed portions of the casing side wall, said spray assembly comprising rotor means having equally circumferentially spaced radial horizontal spray pipes having closed outer ends, the spray pipes being in communication at their inner ends with the steam pipe, downwardly angled longitudinally spaced jet nozzles on and communicating with the spray pipes, said nozzles being on the trailing sides of the spray pipes, said spray pipes having fins extending along their tops, said fins being disposed at an upward angle relative to the horizontal and reaching beyond the trailing sides of the spray pipes, said rotor means having a hub journalled on the steam pipe, from which the spray pipes are supported, said hub having a pendant shaft, brace bars beneath the spray pipes, said brace bars being downwardly and inwardly angled relative to the horizontal with their outer ends secured to the spray pipes at the outer ends thereof, the inner ends of the brace bars being connected to the pendant shaft, and a fixed frusto-conical impact cage beneath the rotor means, said cage comprising a multiplicity of closely and equally circumferentially spaced radial impact bars located closely beneath said brace bars, said impact bars being disposed at a downward and inward angle relative to the horizontal and being connected together at their inner ends and connected to the casing side wall at their outer ends.

8. Apparatus according to claim 1, wherein vertically spaced overlapped downwardly angled baffles are located between the spray assembly and the top wall of the casing and extend rearwardly from opposed portions of the casing side wall, said spray assembly comprising rotor means having equally circumferentially spaced radial horizontal spray pipes having closed outer ends, the spray pipes being in communication at their inner ends with the steam pipe, downwardly angled longitudinally spaced jet nozzles on and communicating with the spray pipes, said nozzles being on the trailing sides of the spray pipes, said spray pipes having fins extending along their tops, said fins being disposed at an upward angle relative to the horizontal and reaching beyond the trailing sides of the spray pipes, said rotor means comprising vertically spaced upper and lower rotors, the spray pipes of the upper rotor having fins thereon, and the spray pipes of the lower rotor being devoid of fins.

(References on following page)

References Cited

UNITED STATES PATENTS

| | | | |
|---|---|---|---|
| 61,391 | 1/1867 | Bright | 230—116 |
| 1,098,389 | 6/1914 | Lister | 159—4 X |
| 1,397,557 | 11/1921 | Smith | 55—227 X |
| 2,396,526 | 3/1946 | Nilson | 55—231 X |
| 2,539,344 | 1/1951 | Carrayway | 261—3 |
| 2,658,735 | 11/1953 | De Ybarrondo | 261—7 |
| 3,104,803 | 9/1963 | Flatt | 55—230 X |
| 3,128,320 | 4/1964 | Umbricht | 55—230 X |
| 3,168,596 | 2/1965 | Jamison | 55—230 X |
| 1,821,549 | 9/1931 | Hornor et al. | 55—417 X |

OTHER REFERENCES

Posselt et al., Odor Abatement with Potassium Permanganate Solutions, I & EC Product Research and Development, vol. 4, No. 1, March 1965.

Emanuel, Potassium Permanganate Offers New Solutions to Air Polution Control, Air Engineering, September 1965.

HARRY B. THORNTON, *Primary Examiner.*

S. W. SOKOLOFF, *Assistant Examiner.*